(12) United States Patent
Asano

(10) Patent No.: US 9,187,805 B2
(45) Date of Patent: Nov. 17, 2015

(54) METHOD FOR SEPARATING AND REFINING SCANDIUM

(71) Applicant: SUMITOMO METAL MINING CO., LTD., Tokyo (JP)

(72) Inventor: Satoshi Asano, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/408,775

(22) PCT Filed: Apr. 1, 2013

(86) PCT No.: PCT/JP2013/059940
§ 371 (c)(1),
(2) Date: Dec. 17, 2014

(87) PCT Pub. No.: WO2013/190879
PCT Pub. Date: Dec. 27, 2013

(65) Prior Publication Data
US 2015/0184268 A1 Jul. 2, 2015

(30) Foreign Application Priority Data

Jun. 19, 2012 (JP) ................................. 2012-137891

(51) Int. Cl.
*C22B 59/00* (2006.01)
*C22B 3/38* (2006.01)
*C01F 17/00* (2006.01)
*C22B 3/26* (2006.01)

(52) U.S. Cl.
CPC ................. *C22B 59/00* (2013.01); *C01F 17/00* (2013.01); *C01F 17/0006* (2013.01); *C01F 17/0043* (2013.01); *C22B 3/004* (2013.01); *C22B 3/0005* (2013.01); *C22B 3/0052* (2013.01); *C01P 2006/80* (2013.01)

(58) Field of Classification Search
None
See application file for complete search history.

(56) References Cited

U.S. PATENT DOCUMENTS 3,554,693 A * 1/1971 Orlandini et al. ............ 423/21.5
5,015,447 A * 5/1991 Fulford et al. ............... 423/21.5
(Continued)

FOREIGN PATENT DOCUMENTS

JP A-1-108119 4/1989
JP A-1-246328 10/1989
(Continued)

OTHER PUBLICATIONS

May 21, 2013 Search Report issued in International Patent Application No. PCT/JP2013/059940 (with translation).
(Continued)

*Primary Examiner* — Steven Bos
(74) *Attorney, Agent, or Firm* — Oliff PLC

(57) ABSTRACT

An object of the present invention is to provide a method for separating and refining scandium capable of efficiently separating and refining the scandium from a solution containing the scandium, with improved stripping, while securing separability (selectivity) of the scandium from impurity elements. The method of the present invention involves mixing a solution containing the scandium with an organic solvent containing a trioctylphosphine oxide to extract the scandium into the organic solvent; and mixing the organic solvent with a stripping starting solution containing any one or more of water, hydrochloric acid, sulfuric acid, and oxalic acid to strip the scandium from the organic solvent.

6 Claims, 3 Drawing Sheets

(56) References Cited

U.S. PATENT DOCUMENTS

| | | | |
|---|---|---|---|
| 5,030,424 A * | 7/1991 | Fulford et al. | 423/21.5 |
| 5,049,363 A | 9/1991 | Feuling | |
| 5,622,679 A | 4/1997 | Yuan et al. | |

FOREIGN PATENT DOCUMENTS

| | | |
|---|---|---|
| JP | A-3-115534 | 5/1991 |
| JP | A-4-36373 | 2/1992 |
| JP | A-4-74711 | 3/1992 |
| JP | A-5-147932 | 6/1993 |
| JP | A-9-184028 | 7/1997 |
| JP | A-9-194211 | 7/1997 |
| JP | A-9-208222 | 8/1997 |
| JP | A-9-291320 | 11/1997 |
| JP | A-2010-270359 | 12/2010 |

OTHER PUBLICATIONS

May 21, 2013 Written Opinion issued in International Patent Application No. PCT/JP2013/059940 (with translation).

* cited by examiner

METHOD FOR SEPARATING AND REFINING SCANDIUM

FIELD OF THE INVENTION

The present invention relates to a method for separating and refining scandium, more specifically to a method for separating and refining scandium in which the scandium is separated and refined by using the solvent extraction method from a solution containing the scandium by applying a leaching treatment to ores and intermediates or the like, containing the scandium.

This application claims priority to Japanese Patent Application No. 2012-137891 filed on Jun. 19, 2012, the entire contents of which are incorporated by reference herein.

BACKGROUND OF THE INVENTION

Since scandium has an especially small ionic radius of rare earth elements, the scandium exists hardly in usual rare earth elements, but occur widely with a very small amount in oxide ores, aluminium, tin, tungsten, zirconium, iron, and nickel or the like.

The scandium has low basicity with the small ionic radius, and thus needs a strong acid for dissolution thereof. Accordingly, because there are so many coexistent elements to be simultaneously dissolved with the scandium and concentration of an aqueous solution is high, it is not easy work to separate and refine the scandium contained in the aqueous solution.

As a typical separation method, the solvent extraction method is widely known, in which an organic solvent is used as an extractant composed of acidic alkyl phosphoric acid, a product name, PC-88A, (principal ingredients: 2-ethylhexyl phosphonic acid 2-ethylhexyl) or the like, as disclosed, for example, in Patent Document 1. Specifically, the solvent extraction method is a method in which an organic solvent is mixed with an aqueous solution containing scandium to extract coexistent elements, iron, aluminium, calcium, and yttrium or the like with the scandium into the organic solvent. Then, a hydrochloric acid solution having concentration of 4 to 9 mol/l is added to the organic solvent to thereby clean the coexistent elements for separating and removing the elements other than the scandium. Finally, a sodium hydroxide aqueous solution is added to the organic solution to separate the scandium from the organic solvent in the form of hydroxide.

However, the method disclosed in Patent Document 1 is unable to strip the scandium as an aqueous solution, and therefore scandium hydroxide is separated from the organic solvent, as solid gummy or gelatinous precipitations. For this reason, it becomes difficult to make a solid-liquid separation between the solvent and the scandium hydroxide, and a problem emerges therefrom that the scandium hydroxide is contaminated by solvent, specially, by phosphorus. Further, since a large amount of extractant is dissolved into water, as sodium salts, every time the scandium is stripped, it is also needed to comprise a recovery treatment of the extractant from an aqueous phase after stripping. Failure to the recovery treatment will result in incurring a markedly increased COD value of drainage, and causing an environmental problem at the end.

Moreover, when zirconium is contained in a solution containing the scandium, a problem emerges therefrom that a large amount of zirconium contained in the scandium produced by the solvent extraction method induces the degradation of the the scandium, as they share a close extraction characteristics of the scandium with each other.

Besides, in an industrial aspect, since the solid gummy or gelatinous precipitations are precipitated and separated, as mentioned above, it cannot proceed with a separation and refinement operation from proceeding by a continuous extraction operation, such as, for example, a mixer settler. Accordingly, it is obliged to proceed a treatment by resorting to a cumbersome batch work, every time the scandium is stripped, and is disadvantageous in terms of labor and cost.

Regarding an extractant, acidic phosphoric ester having an alkylcyclohexyl group has also been invented, as an alkyl chain, in place of a normal 2-ethylhexyl group (for example, see Patent Document 2). However, while such an extractant exhibits a change in a separation factor to impurity elements caused by steric hindrance, the above-indicated problem is still left unsolved as a strong chemical bonding force to the scandium remains unchanged.

Meanwhile, it also contrives to use acidic alkyl phosphoric ester, like an adsorbent in the form where the acidic alkyl phosphoric ester is being supported by resin, instead of the solvent extraction method.

For example, there is disclosed, in Patent Document 3, a method in which 2-ethylhexyl phosphonic acid, di(2-ethylhexy)phosphonic acid, and tributyl phosphoric ester or the like are supported by resin, and the resin is developed in an inorganic strong acid aqueous solution, such as hydrochloric acid, nitric acid, and sulfuric acid, or an organic acid aqueous solution, such as acetic acid, and monochloroacetic acid.

For example, there is disclosed, in Patent Document 4, a method in which scandium is adsorbed by resin impregnated with alkyl phosphonic acid ester and alkyl phosphate ester, and thereafter scandium is leached by an organic solvent together with an extractant.

The methods disclosed in Patent Documents 3 and 4, however, are fraught with difficulties in elution of the scandium from the resin, and have properties such that the scandium forms polymer with an extractant on a resin surface, and solidifies thereon, even in a step of adsorbing the scandium. On this account, a problem emerges therefrom that the scandium itself hinders diffusion of the scandium to the whole extractant with the progress of adsorption.

As a solution to the problem in case of using the above-mentioned phosphate ester, it has been known heretofore a method of using lipophilic aminocarboxylic acids, as is disclosed, for example, in Patent Document 5.

Because weak acidic aminocarboxylic acid has weak affinity with the scandium, it has a property that stripping is easier than acidic phosphate ester. Nonetheless, the aminocarboxylic acid conversely has a strong bonding force with chromium (III), iron (III), and ion or the like, having a high complex stability constant with the aminocarboxylic acid, and therefore, in an extracting power of the scandium in a solution containing these impurities, the impurities are accumulated in a solvent, resulting in a gradual decrease. Further, the structurally strong hydrophilicity entails a problem that a leaching loss to an aqueous solution grows larger.

In this way, a method for allowing efficient separation and refinement of the scandium has not yet been found at the moment.

PRIOR ART DOCUMENT

Patent Document

PTL1: Japanese Patent Application Laid-Open No. H 09-291320

PTL2: Japanese Patent Application Laid-Open No. H 04-36373

PTL3: Japanese Patent Application Laid-Open No. H 01-108119
PTL4: Japanese Patent Application Laid-Open No. H 01-246328
PTL5: Japanese Patent Application Laid-Open No. H 04-74711

SUMMARY OF THE INVENTION

The present invention is proposed in view of such actual circumstances, and an object of the present invention is to provide a method for separating and refining scandium able to efficiently separate and refine the scandium from a solution containing the scandium, with improvement in stripping, while securing separability (selectivity) of the scandium from impurity elements.

Intensive study is made by the inventors of the present invention, in order to attain the above-mentioned object. As a result, they ultimately found out that it enables selective extraction of the scandium, and at the same time improvement in stripping of the scandium by applying an extraction treatment to a solution containing the scandium using an organic solvent, as an extractant, containing trioctylphosphine oxide (TOPO) that is a solvating type extractant.

Namely, the method for separating and refining scandium according to the present invention comprises an extraction step of mixing an aqueous solution containing the scandium with an organic solvent containing a trioctylphosphine oxide to extract the scandium into the organic solvent; and a stripping step of mixing the organic solvent with a stripping starting solution containing any one or more of water, hydrochloric acid, sulfuric acid, and oxalic acid to strip the scandium for producing a post-stripping solution.

Herein, it is desirable to further comprise a scrubbing step of mixing the organic solvent from which the scandium is extracted by the above-mentioned extraction step with a hydrochloric acid solution having concentration of 2.0 mol/l or more to 9.0 mol/l or less, or with a sulfuric acid solution having concentration of 3.5 mol/l or more to 9.0 mol/l or less to separate impurities.

Further, in a case where the sulfuric acid solution or the hydrophilic acid solution is used in the stripping step, as a stripping starting solution, it is desirable to use a hydrochloric acid solution having concentration of less than 2.0 mol/l or a sulfuric acid solution having concentration of less than 3.5 mol l/l.

Further, in a case where the oxalic acid solution is used in the stripping step, as a stripping starting solution, an oxalic acid solution having concentration of from 0.1 mol/l or more to less than 1.0 mol/l is used, as a stripping starting solution to form crystal of scandium oxalate.

Further, in a case where any one or more of the water, the hydrochloric acid solution, and the sulfuric acid are used in the stripping step, as a stripping starting solution, it is desirable to comprise a crystallization step of adding oxalic acid to a post-stripped solution produced by stripping the scandium to form a crystal of scandium oxalate.

Further, in a case where zirconium is contained in an aqueous solution containing the scandium, it is desirable to mix the aqueous solution with an organic solution containing thenoyltrifluoroacetone to extract and separate the zirconium into the organic solvent.

Advantageous Effect of the Invention

According to the present invention, the invention enables selective extraction of the scandium, and at the same time improvement in stripping of the scandium, thus separating and refining the scandium from a solution containing the scandium with a high stripping rate. This reduces the amount of scandium staying in the process system, without being stripped, thereby improving a yield of the scandium.

Further, since the scandium can be stripped in the form of aqueous solution, with high fluidity, the invention enables a separation and refinement operation, for example, by a continuous extracting operation, which facilitates continuation of facilities and high speed running, thereby realizing labor saving even in terms of facility cost.

DETAILED DESCRIPTION OF THE INVENTION

Figure 1:
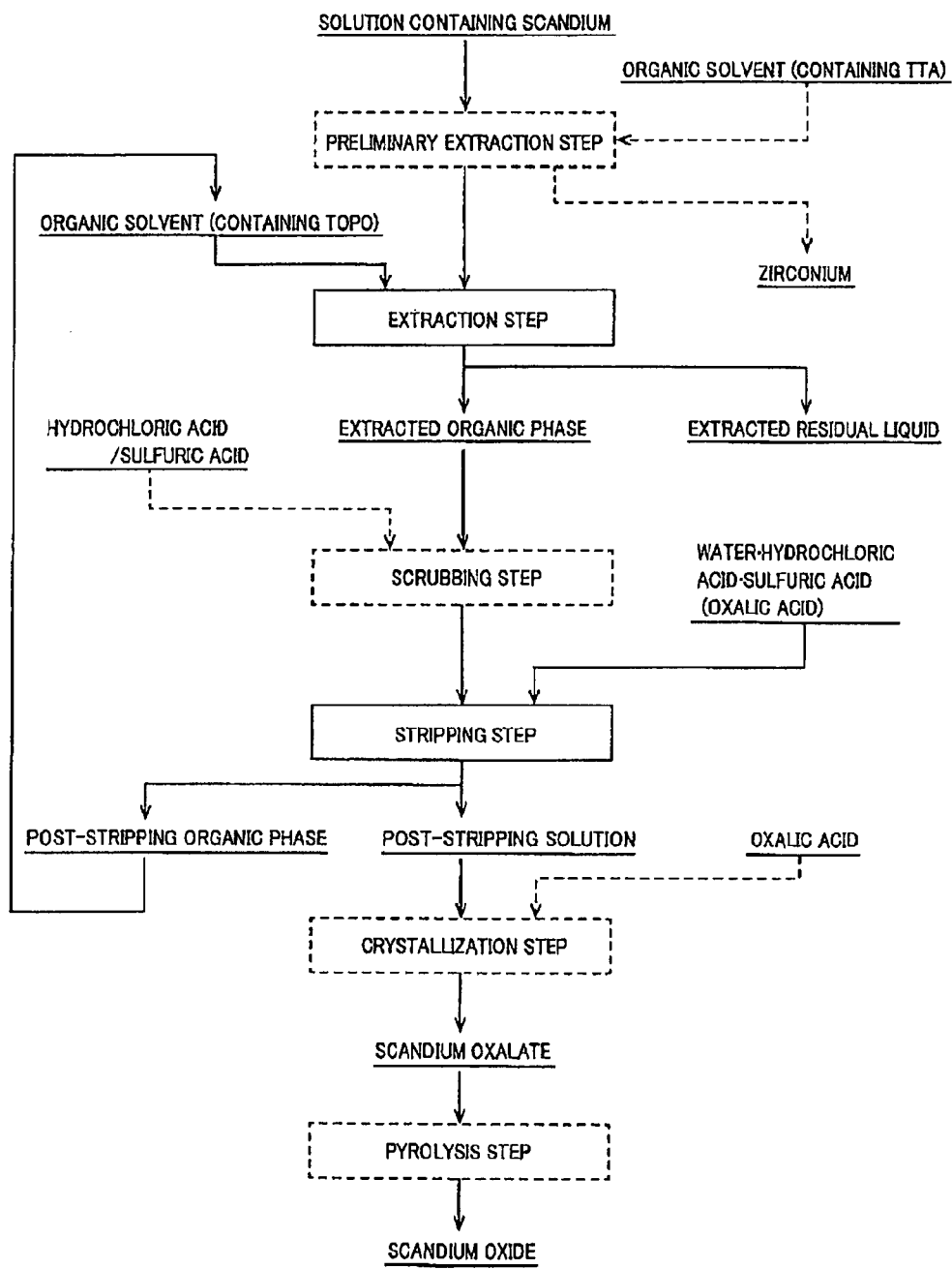
FIG. 1 is a flow chart showing a flow of a separation and refinement method for separating and refining scandium from a solution containing the scandium, and a flow of production method for producing a scandium oxide using the separation and refinement method.

Hereinafter, a detailed description will be made to a method for separating and refining scandium according to the present invention in the following order. It should be noted that the present invention is not necessarily limited to the embodiments to be mentioned later, or rather may be properly modified, unless no change is made to the gist of the present invention.

1. Summary of invention
2. Method for separating and refining scandium
2-1. extraction step
2-2. scrubbing step (cleaning step)
2-3. stripping step
2-4. crystallization step
2-5. conclusion
3. Production method for scandium oxide
4. Examples

1. SUMMARY OF INVENTION

A method for separating and refining scandium according to the present invention is a method for separating and refining scandium by selectively extracting the scandium from a solution produced by applying a leaching treatment to ores and intermediates containing the scandium using an acid solution or the like.

Specifically, the method for separating and refining scandium involves mixing an aqueous solution containing the scandium with an organic solvent containing a trioctylphosphine oxide (expressed as "TOPO" hereinbelow) to extract the scandium into the organic solvent; and mixing the organic solvent with a stripping starting solution containing any one or more of water, hydrochloric acid, sulfuric acid, and oxalic acid to strip the scandium from an organic phase for separating the scandium.

In the method for separating and refining scandium according to the present invention, it is vital that the organic solvent containing a trioctylphosphine oxide is used in an extraction step, and an aqueous solution containing the scandium is mixed with the organic solvent.

Although the details will be described later, the trioctylphosphine oxide used, as an extractant, is a solvating type extractant, which is extracted only by the agency of affinity with scandium compounds, and does not form chemical bonding therewith. Further, adjustment of ionic strength of a solution allows easy control of extraction and stripping. Therefore, it is quite unlikely to precipitate a gummy or gelatinous solid in a post-stripping solution due to the formation of strong chemical bonding, and impede the fluidity of an organic phase and an aqueous phase, as in a situation where the scandium is extracted by an acidic extractant, which strips with high fluidity in the form of aqueous solution. This improves in a stripping.

From this, according to the method for separating and refining scandium, it enables the reduction of the amount of scandium staying in the process system, without being stripped, thus separating and refining the scandium from a solution containing the scandium with a high yield. Further, the stripping with high fluidity allows a continuous extraction operation and facilitates high fluidity, which renders the size of treatment facilities compact. This realizes labor saving in terms of facility cost.

Hereinafter, a description will be made in more detail to specific embodiments of method for separating and refining scandium according to the present invention (referred to as "the present embodiment" hereinbelow).

2. METHOD FOR SEPARATING AND REFINING SCANDIUM

As shown in a flow chart of FIG. 1, a method for separating and refining scandium according to the present embodiment includes an extraction step of mixing an aqueous solution containing the scandium with an organic solvent containing a trioctylphosphine oxide (TOPO) to extract the scandium into the organic solvent; and a stripping step of mixing the organic solvent with a stripping starting solution containing any one or more of water, hydrochloric acid, sulfuric acid, and oxalic acid to strip the scandium from the organic solvent for producing a post-stripping solution.

Alternatively, in the method for separating and refining scandium, it may provide a scrubbing step of mixing the organic solvent with a hydrochloric acid solution or a sulfuric acid solution having predetermined concentration to clean the scandium, after extraction and before stripping of the scandium, by an organic solvent containing a trioctylphosphine oxide in the extraction step. This separates and removes impurity elements, which are coexisting in a solution to be treated and extracted into the organic solution together with the scandium, into an aqueous phase, thereby further improving purity of scandium compounds.

Instead, in the stripping step, in a case where a stripping treatment is applied by using a stripping starting solution containing any of water, hydrochloric acid, and sulfuric acid, it may provide a crystallization step of adding oxalic acid to a post-stripping solution produced by stripping to form a crystal of scandium oxalate. This separates and removes the scandium as hardly soluble oxalate.

Hereinafter, a description will be made more specifically to each step.

<2-1. Extraction Step>

In an extraction step, a solvent extraction treatment is applied in which an aqueous solution containing the scandium (scandium containing solution), produced by applying a leaching treatment to ores and intermediates containing the scandium by using acid solutions, such as hydrochloric acid and sulfuric acid, is mixed with an organic solvent containing an extractant to selectively extract the scandium into the organic solvent.

In the extraction step, when extracting and separating the scandium by the solvent extraction method, an organic solvent containing a solvating type extractant (solvate extractant) is used. Specifically, a trioctylphosphine oxide (TOPO) is used as an extractant.

Herein, it is conceived that when separating and extracting the scandium, an acidic extractant is used as an extractant. The acidic extractant is an extractant in which—H of the extractant is substituted by a cation, such as a scandium ion to form a metal salt, thereby extracting a metal ion. However, the acidic extractant is forming strong chemical bonding with a metal ion, and thus stripping of the scandium cannot be performed unless the strong chemical bonding thereof breaks. For example, the use of a phosphoric acid-based extractant, such as acidic phosphoric ester, as an acidic extractant enhances selectivity of the scandium, by virtue of extremely strong affinity between phosphoric acid and the scandium, but it gets hard to break the chemical bonding (for example, see the following reaction formula (1)). In consequence, a gummy or gelatinous solid is precipitated, and this aggravates the fluidity of an organic phase and an aqueous phase, which makes an effective and efficient stripping treatment difficult. Moreover, it is forced to separately add alkali, for example, sodium hydroxide for the purpose of breaking the strong chemical bonding.

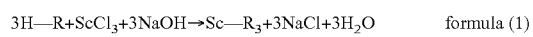

$$3H—R+ScCl_3+3NaOH \rightarrow Sc—R_3+3NaCl+3H_2O \quad \text{formula (1)}$$

(where H—R represents an acidic extractant)

The use of carboxylic acid having a weak chemical bonding force with a metal ion, as an acidic extractant improves in the stripping, but selectivity of the scandium is impaired for lack of phosphoric acid therein, driving the carboxylic acid into an unusable state, as a refinement medium.

In contrast, a solving type extractant is an extractant containing in a molecule a functional group having affinity with unionized molecular metallic compounds, and extracting the scandium by the agency of affinity with the metallic compounds. Hence, as the solving type extractant extracts the scandium by bonding, only by the agency of affinity, with the scandium compounds, and does not form chemical bonding, the fluidity of a post-stripping solution is improved, which facilitates stripping of the scandium.

Further, increased ionic strength in an aqueous phase encourages solvation of the solving type extractant, accelerating an extraction reaction. Conversely, decreased ionic strength accelerates a stripping reaction. Thus, control of the ionic strength based on adjustment of salt concentration in a solution enables easy control of extraction and stripping.

Describing in detail in this regard, since metal compounds generally have a property that when they are dissolved into water, a water molecule surrounds respectively an anion and a cation for stabilization (hydration), it gets into difficulties in taking the metal compounds in an organic solvent containing the solvating type extractant in their present conditions. Nevertheless, salts easy to be dissolved into water are dissolved into a solution, that is, increase ionic strength propels water molecules in an aqueous solution to be dissolved one after another into ions composing the added salts, eventuating in a state where free water hardly exists. Then, it throws into a situation disabling the metallic compounds from hydrating, and a ratio will increase where the metallic compounds exist in a molecular state. It follows that the metallic compounds come to be able to be extracted by the solvating type extractant. Meanwhile, when the solvating type extractant contacts an aqueous solution and water whose ion strength is lower than an extracted condition, ions composing the metallic compounds are hydrated for stabilization. Therefore, it becomes difficult for the metallic compounds to stay within the organic solvent, resulting in making a stripping reaction progress. In this way, the use of the solvating type extractant can control extraction and stripping reactions freely by adjusting salt concentration of solution to control the ion strength.

The solvating type extractant includes phosphorus-based and non-phosphorus-based extractants. When placing importance on the high selectivity of the scandium to be separated and refined, a solvating type extractant containing phosphorus is particularly suitable therefor. Among other things, it is particularly desirable to use a trioctylphosphine oxide (TOPO), from the perspective that it allows more efficient extraction and stripping of the scandium.

An extraction reaction formula where TOPO is used as an extractant is demonstrated in the following reaction formula (2). As shown in the reaction formula (2), only scandium compounds have affinity with and added to the extractant, and extracted by a reaction free from the formation of chemical bonding.

$$3TOPO + ScCl_3 \rightarrow ScCl_3 \cdot 3TOPO \quad \text{formula (2)}$$

As a trioctylphosphine oxide used as an extractant, there exists various types of trioctylphosphine oxides having different alkyl chains but all of them can be preferably provided for use.

A melting point of the trioctylphosphine oxide is about 60 degrees C. and is solid at room temperature. Therefore, the trioctylphosphine oxide is used by diluting, for example, with an organic solvent, such as hydrocarbon. In this connection, some compounds which have functional base (PO) identical with that of the trioctylphosphine oxide and a similar structure, including a different alkyl chain, are liquid at room temperature. Thus, dilution is not always compulsory when the relevant compounds are liquid.

No special limitation is imposed on concentration of the organic solvent of trioctylphosphine oxide, but it is desirable to set to 5 v/v % or more to 20 v/v % or less. The maximum extraction capability of the scandium is Sc:1.8 g/l or so when concentration of TOPO in the organic solvent is, for example, 5 v/v %, and Sc:11.4 g/l or so when concentration thereof is 40 v/v %. As above-mentioned, the higher the concentration in the organic solvent of TOPO gets, the higher the extraction capability becomes while the amount of extraction of the scandium per volume of TOPO decreases. Accordingly, taking into account of phase separation or the like, when extracting and stripping the scandium, it is desirable to set to 5 v/v % or more to 20 v/v % or less, as concentration within the organic solvent of TOPO. Particularly, it is more desirable to set to 10 v/v % or so. Depending on the kind of hydrocarbon of the organic solvent, solubility of TOPO varies, but concentration of 40 v/v % or so is almost an upper limit around room temperature of 25 degrees C.

No special limitation is imposed on a solution containing the scandium serving as a raw liquid, but any humoral aqueous solution may be available. As mentioned above, the higher the ion strength of solution containing the scandium has, the more advantageous for extraction on account of acceleration of solvation by TOPO becomes. In other words, for a solvation reaction to progress, it is important that a compound to be extracted is molecular. In order to inhibit dissociation of the compound, it is desirable to increase the ion strength, with salt concentration being kept high.

As mentioned above, it is particularly desirable to use a solvent containing the scandium composed of a hydrochloric acid solution of 2.0 mol/l or more, or a sulfuric acid solution of 3.5 mol/l or more, as with concentration of a scrubbing solution to be mentioned later. This improves an extraction effect of the scandium. Incidentally, even when extraction is made by using a solution having concentration lower than these concentrations, it has no problem in practical use by providing multiple stages two or more.

<2-2. Scrubbing Step (Cleaning Step)>

The TOPO that is an extractant used in the above-mentioned extraction step has high selectivity of impurities coexistent in the solution. However, in case a large excess of impurity elements coexists within a solution containing the scandium other than the scandium to be extracted, it is desirable, after extraction and before stripping of the scandium, to apply a scrubbing (cleaning of solvent) to the organic solvent (organic phase) thereof to separate impurity elements into an aqueous phase to remove the scandium from an extractant.

Thus, the inclusion of the scrubbing step in which the organic solvent is cleaned to remove the impurity elements more enhances purity of the scandium compounds to be produced through respective steps to be mentioned later.

As a solution (cleaning solution) used for scrubbing, it may use a hydrochloric acid solution and a sulfuric acid solution. Certainly, it is possible to perform scrubbing by using a nitric acid solution, but it is undesirable due to the acceleration of oxidative degradation of TOPO that is an extractant. Further, it is allowed to use a chloride and a sulfide soluble to water, in place of a hydrochloric acid solution and a sulfuric acid solution. However, since it is likely that the use of salts made, for example, of an alkali metal will cause new impurities, it is undesirable in the point of too high refinement of the scandium.

In a case where a hydrochloric acid solution is used, it is desirable for concentration of a cleaning solution to be used for scrubbing to set to 2.0 mol/l or more to 9.0 mol/l or less. In a case where a sulfuric acid solution is used, it is desirable to set to be in the concentration range of from 3.5 mol/l or more to 9.0 mol/l or less.

Herein, when the scandium contained in a hydrochloric acid solution and a sulfuric acid solution is extracted by using TOPO, the maximum extraction effect is exerted at the time when the hydrochloric acid solution has concentration of 6.5 mol/l and the sulfuric acid solution has concentration of 7.0 mol/l. The farther the concentration departs from the range, the more strengthen the tendency to gradually increase the amount of scandium to be stayed within a raw liquid without being able to extract the scandium. As mentioned above, this is attributable to the fact that the increased ion strength in a solution increases a ratio at which the metallic compounds exist in a molecular state as they are, and come to be extracted by the solvating type extractant, and that further increased ion strength evokes a distinct reaction in which a metal forms a complex ion in an aqueous solution for stabilization.

As mentioned above, in the scrubbing step, it is desirable to clean a solvent by using the hydrochloric acid solution or the sulfuric acid solution having the above-mentioned concentration range (see also investigation into acid concentration dependency in the following Example 2). This prevents a situation that even scandium extracted together with metallic impurities because of cleaning of the organic solvent from being stripped, and cleaned and removed, which suppresses a loss. In comparison with the hydrochloric acid solution and the sulfuric acid solution, the hydrochloric acid solution is more desirable because the loss concentration can be kept low.

As for the number of cleaning stage (frequency), in a case where a phase ratio between an organic phase (O) and an aqueous phase (A) is, for example, set to O/A=1/1, if there are stages of 3 to 5, it is able to separate almost all of the elements other than zirconium to be mentioned later, up to less than a lower limit of detection of an analysis device, though it varies depending on the kind and concentration of the impurity elements.

<2-3. Stripping Step>

In the stripping step, the scandium is stripped from an organic solvent from which the scandium is extracted through the extraction step, or from an organic solvent from which impurity elements are separated and removed through the scrubbing step after the scandium is extracted in the extraction step.

In the stripping step, water or an acid solution having low concentration is mixed with the organic solvent by using an acid solution as a stripping solution (stripping starting solution) to cause a stripping represented by the above-mentioned reaction formula (2), thereby stripping the scandium to produce a post-stripping solution containing the scandium.

Herein, as mentioned above, an extraction ratio will become high as acid concentration of a solution increases in the extraction of the scandium. In other words, it means that a stripping ratio will become low as the acid concentration increases in the context of stripping of the scandium. Therefore, judging from standpoint of stripping rate, it is most advantageous to apply a stripping treatment by using water. However, it is liable that extremely lowered ion strength of an aqueous phase provokes a failure of phase separation from an organic phase, which causes production of emulsion. From this, it is desirable in practical use to apply a stripping treatment by using a solution (acid solution), where very small amount of acid exists, as a stripping starting solution.

As an acid solution, it may use a hydrochloric acid solution and a sulfuric acid solution. It is desirable to set to have concentration of less than 2.0 mol/l in case of the hydrochloric acid solution, and have concentration of less than 3.5 mol/l in case of the sulfuric acid solution. Particularly, it is more desirable to set to 0.05 mol/l or more to 0.3 mol/l or less in case of the hydrochloric acid solution.

As with the above-mentioned hydrochloric acid solution and the sulfuric acid solution, it may use an oxalic acid solution as a stripping starting solution. Mixing the oxalic acid solution from which the scandium is extracted with the organic solvent to interact enables the formation and the recovery of a crystal of scandium oxalate without a crystallization step to be mentioned later, as shown in the following formula (3).

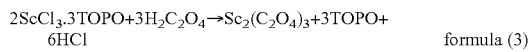

$$2ScCl_3 \cdot 3TOPO + 3H_2C_2O_4 \rightarrow Sc_2(C_2O_4)_3 + 3TOPO + 6HCl \quad \text{formula (3)}$$

Additionally, a stripping reaction where the oxalic acid solution is used as a stripping starting solution is not a reversible reaction. Thus, it allows progress of the stripping reaction more completely than a stripping treatment by a reverse reaction represented by the reaction formula (2) using a hydrochloric acid solution and a sulfuric acid solution, thereby further enhancing a stripping ratio.

No special limitation is imposed on concentration of an oxalic acid solution, in a case where the oxalic acid solution is used as a stripping solution, but it is desirable to set to have concentration of 0.1 mol/l or more to less than 1.0 mol/l. It is likely that the scandium oxalate will not effectively be produced due to excessively weak stripping power when the concentration is set to less than 0.1 mol/l. Meanwhile, solubility to water of oxalic acid itself is not high and an upper limit thereof is around 1 mol/l. Even though the concentration is set to over the upper limit, a crystal is only precipitated As for the usage amount of the oxalic acid solution, that is, the amount of oxalic acid solution necessary for stripping of the scandium and form crystallization of the scandium oxalate, it is desirable to set to the amount corresponding to an equivalent or more in terms of the calculation amount relative to the amount of scandium contained in an extracted organic solvent. This securely converts the extracted scandium into a crystal of scandium oxalate.

As mentioned above, in the stripping reaction using an oxalic acid solution, an adverse effect may affect stripping because a solid crystal of the scandium oxalate is precipitated. However, because the solid crystal is hydrophilic, high fluidity can be maintained without preventing a phase separation between an organic solvent (organic phase) and an aqueous phase, unlike the conventional method in which gummy or gelatinous solid hydroxide scandium is produced after stripped by using an acidic extractant. Therefore, when the solid crystal of the scandium is left in a standing condition, after mixing with an organic solvent in the stripping treatment, the crystal of the scandium disperses into an aqueous phase, and further rapidly precipitates to the bottom of the aqueous phase, thus the crystal of scandium can be easily separated and recovered.

As a stripping starting solution, it may be a solution containing solely any one of the above-mentioned water, hydrochloric acid, sulfuric acid, and oxalic acid, or be a solution containing in combination any two or more of them.

<2-4. Crystallization Step>

As mentioned above, extracting the scandium containing the trioctylphosphine oxide using an organic solvent, and mixing the produced organic solvent with a stripping starting solution containing any one or more of water, hydrochloric acid, sulfuric acid, and oxalic acid to strip the scandium allows separation and refinement of the scandium, in the form of solution, with high fluidity.

Hereupon, it is desirable for the scandium contained in a post-stripped solution produced in the above-mentioned stripping step to recover the scandium as a solid crystal. This condenses the scandium in the post-stripped solution to more enhance a refinement effect, and at the same time increases recovery efficiency.

In the present embodiment, it may comprise a crystallization step of forming a solid crystal of the scandium from the post-stripped solution produced through the above-mentioned stripping step.

In the crystallization step, oxalic acid is added to the post-stripped solution produced, in the above-mentioned stripping step by stripping the scandium by using any one or more of water, a hydrochloric acid solution, and a sulfuric acid solution as a stripping starting solution to produce crystal of scandium oxalate.

As mentioned above, since in a case where the scandium is stripped by using an oxalic acid solution as a stripping starting solution by the stripping step, it allows the formation and the recovery of a crystal in a stripping treatment, it eliminates the need for the crystallization step. Accordingly, in a case where a stripping treatment is applied by using any one or more of water, a hydrochloric acid solution, and a sulfuric acid solution, a solid crystal of the scandium is formed and recovered by the crystallization step.

As a method for forming a solid crystal of the scandium from a post-stripped solution containing the scandium, it is desirable to use a method in which the scandium is separated as hardly soluble oxalic acid salts by adding an oxalic acid, that is the common method for producing rare earth salts. While the scandium forms hardly soluble crystal as with another rare earth elements, at the same time the other majority of impurity elements form a complex with the oxalic acid and, remaining in a mother liquid, it can be expected to exert a further refinement effect, thereby producing scandium compounds of higher purity.

As with the additive amount of oxalic acid, it is desirable to set to an amount corresponding to an equivalent or more in terms of calculation amount, relative to the amount of scandium contained in the post-stripped solution. This securely converts the stripped scandium into a crystal of scandium oxalate.

<2-5. Conclusion>

As mentioned above, in the method for separating and refining scandium according to the present embodiment involves mixing a solution containing the scandium with an organic solvent containing the trioctylphosphine oxide to extract the scandium, and subsequently mixing the organic solvent with a stripping starting solution containing any one or more of water, hydrochloric acid, sulfuric acid, and oxalic acid to strip the scandium.

According to the method for separating and refining scandium, it is able to avoid falling into a situation where a gummy or gelatinous solid is precipitated into a stripped solution due to the formation of strong chemical bonding, and fluidity of an organic phase and an aqueous phase are not hindered. This strips the scandium, in the form of aqueous solution, with high fluidity, thus improving stripping of the scandium.

This decreases the amount of scandium staying in the process system, without being stripped, which separates and refines the scandium with a high stripping rate from a solution containing the scandium. Further, stripping of the scandium with high fluidity allows a continuous extraction operation and facilitates high speed running. This makes treatment facilities compact, which realizes labor saving in terms of facilities and cost.

Further, since extraction and stripping can easily be controlled by regulating the ion strength of solution, it further improves a stripping ratio by adjusting concentration of acid solution to be used as a stripping solution so as to enter within a predetermined range, thereby reducing a loss of the scandium to be separated and refined.

Moreover, the inclusion of a step of mixing the organic solvent with a hydrochloric acid solution or a sulfuric acid solution having predetermined concentration after extraction of the scandium to clean the scandium allows effective removal of impurity elements, thus improving purity of the scandium compounds.

Incidentally, in some solutions that are solutions to be treated (raw liquid) containing the scandium by the above-mentioned method for separating and refining scandium often coexist with zirconium having a chemical property similar to that of the scandium. In the event the solution where such zirconium is coexisting is taken to be treated, it is likely that zirconium will be unable to be separated thoroughly by relying upon the above-mentioned method.

Then, in case the zirconium coexists in a solution to be treated containing the scandium, in which case, it is desirable to comprise a preliminary extraction step of extracting and separating the zirconium in the solution, prior to the extraction step in the above-mentioned method for separating and refining scandium.

In the preliminary extraction step, a solution containing the scandium coexisting with the zirconium is mixed with an organic solvent containing thenoyltrifluoroacetone (appropriately expressed to be "TAA" hereinbelow) to extract and separate the zirconium into the organic solvent.

The zirconium has a property of being easier to form an anion complex than the scandium. After studying of zirconium as an anion, the inventors of the present invention finally found out, as a type of extractant adequate for extraction for anion, that the thenoyltrifluoroacetone that is a type of β-diketones specially has high extraction and separation properties of the zirconium, and scarcely extract the scandium.

The thenoyltrifluoroacetone is solid at room temperature, as with the trioctylphosphine oxide (TOPO), and thus it is desirable to use it in a diluted state so as to enter within the concentration range between 50 g/l or more to 100 g/l or less by using a hydrocarbon-based solvent.

In the preliminary extraction step, it is desirable to apply a stripping treatment after the zirconium is extracted by using an organic solvent containing TAA, and repeat these operations several times. However, in case a grade of zirconium in a solution containing the scandium is, for example, at a low level lower than 100 ppm or so relative to the scandium, only extraction operation may be repeated, without conducting every time a stripping operation.

3. PRODUCTION METHOD FOR SCANDIUM OXIDE

A scandium oxide can be produced by the above-mentioned method for separating and refining scandium using the scandium separated and refined from a solution containing the scandium.

Specifically, the production method for scandium oxide involves an extraction step of mixing a solution containing scandium with an organic solvent containing a trioctylphosphine oxide (TOPO) to extract the scandium into the organic solvent; a stripping step of mixing the organic solvent with a stripping starting solution containing any one or more of water, hydrochloric acid, sulfuric acid, and oxalic acid to strip the scandium from the organic solvent for producing a post-stripped solution; a crystallization step of adding the oxalic acid to the produced post-stripped solution to form a crystal of scandium oxalate when the scandium is stripped by the stripping step using a stripping starting solution containing any one or more of water, hydrochloric acid, and sulfuric acid; and a pyrolyzing step of heating and pyrolyzing the produced scandium oxalate to produce a scandium oxide.

In the production method for scandium oxide, an explanation of an extraction step and a stripping step is omitted as they are same as those in the above-mentioned method for separating and refining scandium. Likewise, in the crystallization step, in a case where the scandium is stripped by the stripping step using a stripping starting solution containing any one or more of water, hydrochloric acid, and sulfuric acid, a solid crystal of scandium oxalate is produced to recover the scandium by adding oxalic acid to the produced a post-stripped solution. In this connection, in a case where the scandium is stripped in the stripping step using an oxalic acid solution as a stripping starting solution, as a crystal of the scandium oxalate is produced with the stripping treatment thereto, it has only to recover the crystal.

In the production method for scandium oxide, after the solid crystal of scandium oxalate is recovered, a pyrolysis step (scandium oxide conversion step) is applied in which the scandium oxalate is heated to apply a pyrolysis (calcination) treatment to produce a scandium oxide that is an oxide. This converts the scandium into a form easy to use.

No special limitation is imposed on treatment conditions in the pyrolysis step, but it may charge a solid crystal of the scandium oxalate produced by crystallization, for example, into a pyrolyzer, such as a tube furnace, and conduct a treatment under thermal conditions, in the range of 700 degrees C. or more to 900 degrees C. or less or so, under an oxygen atmosphere.

In such production method for scandium oxide, it allows selective extraction of the scandium using an organic solvent containing a trioctylphosphine oxide from a solution containing the scandium, and stripping of the scandium with high fluidity, thus producing the scandium oxide from a solution containing the scandium that is a raw liquid with a high yield. Moreover, the produced scandium oxide contains lower grade impurity elements, and therefore constitutes high purity compounds.

4. EXAMPLES

While Examples of the present invention will be described below, the present invention is not necessarily limited to the following Examples.

Examples

Example 1

(1) Extraction Step

A solution (raw liquid) containing scandium (Sc) of 103 L composed of compositions listed in Table 1 below was mixed with an organic solvent of 2.6 L where a trioctylphosphine oxide (TOPO) (HOKKO CHEMICAL INDUSTRY CO., LTD) was dissolved at concentration of 13 v/v % into a Shellsol A solvent (made by Shell Chemicals Co., Ltd), while stirring, for 60 minutes, to produce an extracted organic phase containing the scandium. At this moment, concentration of the scandium in an extracted residual liquid was less than 0.1 mg/l, and an extraction rate was 99.8% or more.

TABLE 1

| Sc | Y | Lu | Co | Ni |
|---|---|---|---|---|
| 0.055 | 0.005 | 0.001 | <0.001 | 221 |

(2) Scrubbing Step (Cleaning Step)

Next, the organic solvent (extracted organic phase) containing the scandium produced in the extraction step was mixed, so as to be a phase ratio of O/A=1/1 using a hydrochloric acid solution having concentration of 6.5 mol/l, and cleaned by stirring a mixture for 10 minutes. Thereafter, an aqueous phase was separated, an organic phase was again mixed with a new hydrochloric acid solution having concentration of 6.5 mol/l and cleaned, and an aqueous phase was similarly separated. Such a cleaning operation was repeated 3 times in total.

Figure 2:
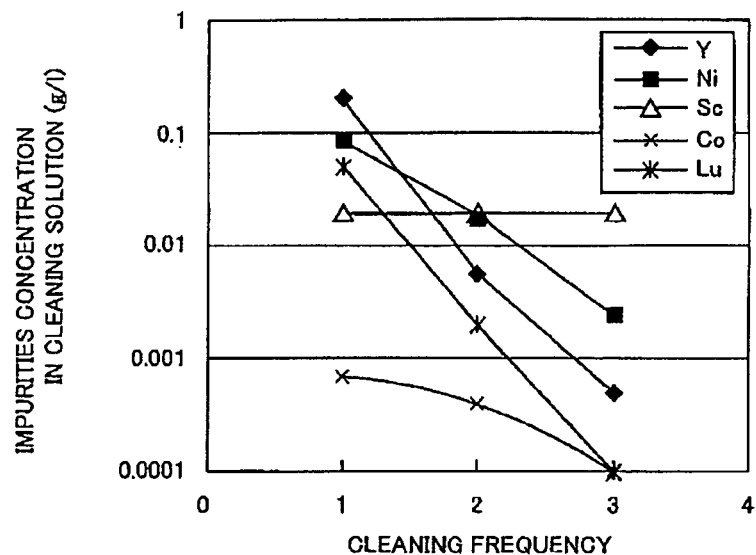
FIG. 2 is a graph illustrating a relationship between the cleaning frequency and concentration of metallic impurities in a cleaning solution in a cleaning step of Example 1.

FIG. 2 shows a relationship between the cleaning frequency to an organic solvent and a metal grade (metallic impurities concentration) in a cleaning solution.

As shown in FIG. 2, it proved that cleaning of extracted organic phase repeated 3 times allowed removal of the metallic impurities concentration to a level of 0.001 g/l or less. Meanwhile, it proved that the scandium stays in a loss of 0.01 g/l order, and only impurities could effectively be removed, without separating the scandium extracted into the organic solvent into an aqueous phase.

(3) Stripping Step

Subsequently, an extracted organic phase after cleaning was mixed so as to be a phase ratio of O/A=1/1 using a hydrochloric acid solution having concentration of 1% (about 0.3 mol/l), stirred for 20 minutes, and the scandium was stripped into an aqueous phase. After that, the stripped scandium was left in a standing condition to separate the scandium from the aqueous phase, the separated scandium was similarly mixed again using a new hydrochloric acid solution having concentration of 1% to separate the scandium from the aqueous phase. Such a stripping operation was repeated 3 times.

Figure 3:
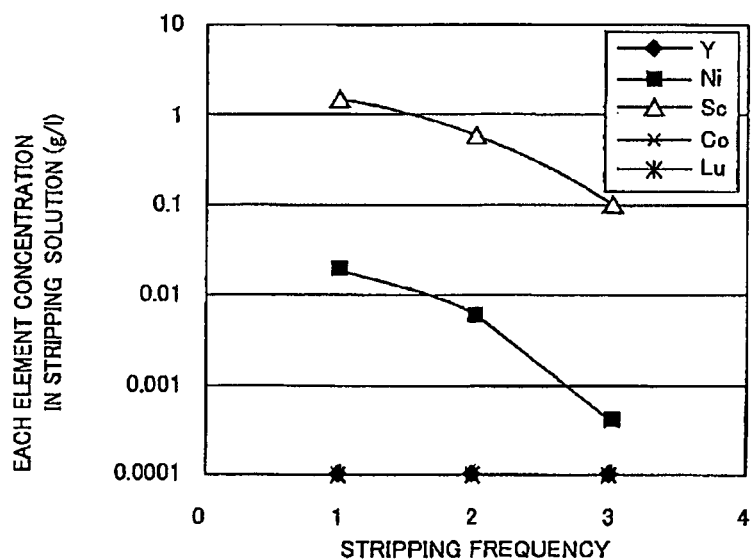
FIG. 3 is a graph illustrating a relationship between the stripping frequency and concentration of metal elements in a post-stripped solution in a stripping step of Example 1.

FIG. 3 shows a relationship between the b stripping operation frequency and concentration of each metallic element of an aqueous phase in a stripped solution.

The total amount of scandium in a solution (a post-stripping solution) after stripping repeated 3 times accounts for 98.3% of the amount contained in a raw liquid, proving that almost all of that could be extracted. Further, as shown in FIG. 3, it proved that Nickel (Ni) existing at high concentration as impurities was contained about 1% or so relative to the scandium, but all the other impurity elements could be reduced to less than 0.1 mg/l.

(4) Scandium Oxide Conversion Step

A post-stripped solution produced by repeating 3 times the above-mentioned stripping operation was mingled, a crystal of 18 g of oxalic acid dihydrate (made by MITSUBISHI GAS CHEMICAL COMPANY, INC.) equivalent to a double quantity in terms of calculation amount relative to the amount of scandium contained in an extracted solution was dissolved, and mixed while stirring for 60 minutes to produce white crystalline precipitates of scandium oxalate. Then, the produced white crystalline precipitates were suctioned and filtered, cleaned with pure water of 500 ml, and then dried for 8 hours at 105 degrees C.

Subsequently, the dried oxalate was transferred to a boat made of high purity magnesia, placed in a tube furnace of quartz tube, with supplying air at a flow rate of 2 L/min, pyrolyzed for 2 hours at temperature of 850 degrees C. to produce a scandium oxide. After that, the produced scandium oxide was cooled to room temperature, taken out, and analyzed a metal grade contained in the oxide by the emission spectrochemical analysis method. The results of analysis were shown in Table 2.

TABLE 2

| Y | Lu | Co | Ni |
|---|---|---|---|
| <1 | <1 | <1 | <1 |

As shown in Table 2, it proved that all the main impurity elements were separated to less than 1 ppm, and the other elements detected by the emission spectrochemical analysis method where iron (Fe) was 4 ppm, and calcium (Ca), magnesium (Mg), antimony (Sb) and silicon (Si) were less than 1 ppm, respectively. Thereby, high purity scandium oxide comparable to purity of 5N was produced.

Example 2

As for Acid Concentration Dependency of Sc Extraction and Sc Stripping

A chloride solution of 100 L containing scandium of 0.11 g/l and nickel of 220 g/l was mixed with an organic solvent of 6.7 L produced by diluting TOPO by using a Shellsol A solvent into 10 vol. %, mixed while stirring for 10 minutes to extract the scandium into an organic phase. A phase ratio of O/A was a ratio of 1/15.

Figure 4:
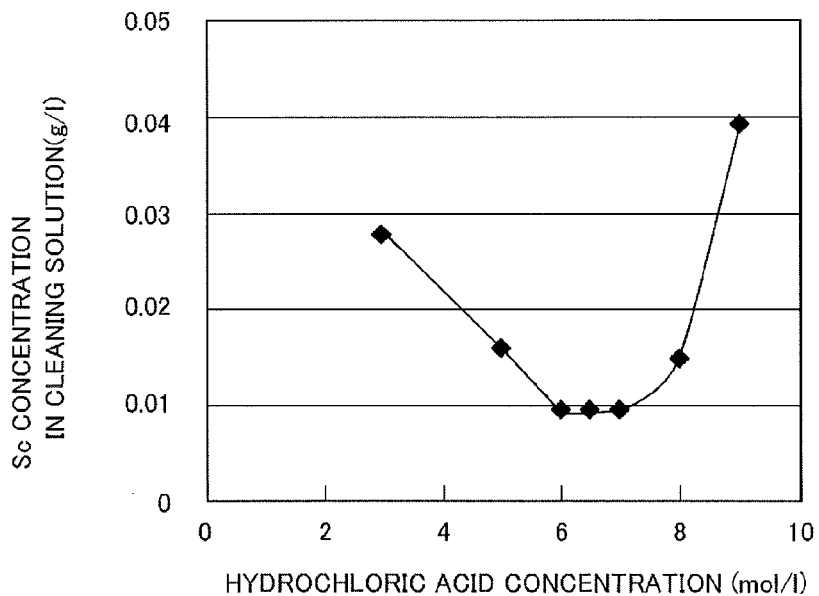
FIG. 4 is a graph illustrating a relationship between concentration of a hydrochloric acid solution (cleaning solution) used for a cleaning treatment and concentration of scandium (Sc) in a cleaning solution.
Figure 5:
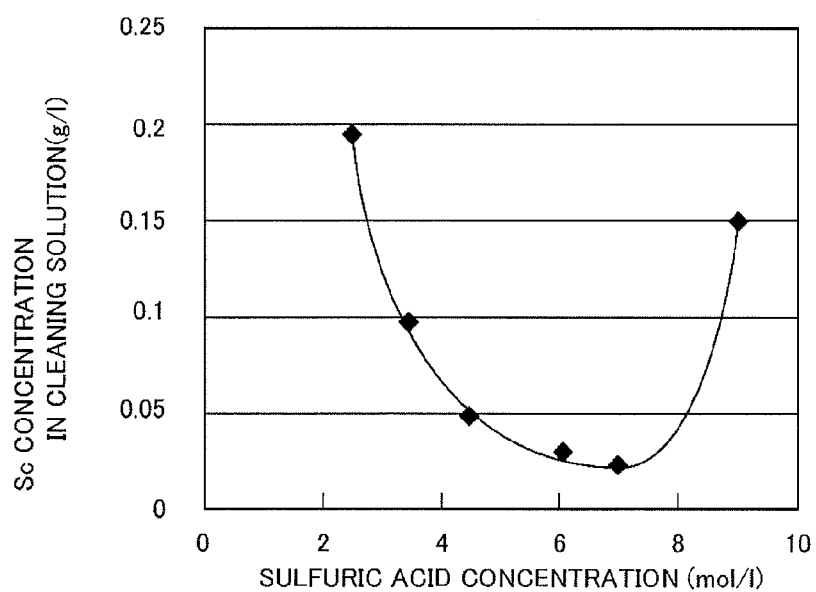
FIG. 5 is a graph illustrating a relationship between concentration of a sulfuric acid solution (cleaning solution) used for a cleaning treatment and concentration of scandium (Sc) in a cleaning solution.

Then, the produced organic phase of 50 ml was taken out, shaken and mixed within a separatory funnel, by using a hydrochloric acid solution or a sulfuric acid solution having various concentrations so that the organic phase ran up to a phase ratio of O/A=1/1, and cleaned the extracted organic phase. FIGS. 4 and 5 show relationships between concentration of each acid solution and that of scandium which was eluted.

As shown in FIG. 4, in a case where the scandium was cleaned by using a hydrochloric acid solution, the scandium showed a sharp increase of an eluting loss, under the concentration conditions of less than 2.0 mol/l or more than 9.0 mol/l. Further, as shown in FIG. 5, in a case where the scandium was cleaned by using a sulfuric acid solution, the scandium equally showed an increase in an eluting loss, under the concentration conditions of less than 3.5 mol/l or more than 9.0 mol/l.

This shows that acid concentration optimum for a stripping treatment is 2.0 mol/l or less in case of hydrochloric acid solution, and 3.5 mol/l or less in case of sulfuric acid solution.

Example 3

Treatment to Raw Liquid Coexisting with Zirconium (Zr)

(1) Dezirconization Step (Zr Extraction Step)

A raw material of 125 g composed of compositions containing zirconium (Zr) shown in Table 3 below was mixed with a hydrochloric acid solution of 600 ml having concentration of 11.5 mol/l, and stirred for 30 minutes to completely dissolve the raw material thereinto. Then, a hydrochloric acid solution having concentration of 11.5 mol/l and pure water were respectively added as much as 400 ml for dilution. Further, a Shellsol A solvent solution of 400 ml containing thenoyltrifluoroacetone (TTA) having concentration of 50 g/l was added, mixed while stirring for 10 minutes, and extracted and separated the zirconium in the raw material. A metal grade of elements other than those shown in Table 3 were all below a lower limit of detection by the emission spectrochemical analysis method.

TABLE 3

| Ca | Mg | Sb | Zr | Fe | Si |
|---|---|---|---|---|---|
| 11 | <0.5 | 7 | 110 | 2 | 14 |

(2) Sc Extraction Step to Cleaning Step

A hydrochloric acid solution of 1.75 L having concentration of 11.5 mol/l and water of 2.25 L were further added to an extracted residual liquid from which the zirconium was removed by the dezirconization step in the step (1), a Shellsol A solvent of 20 L containing TOPO at a rate of 20 v/v % was mixed, and a mixture was stirred for 1 hour to extract the scandium.

Thereafter, a hydrochloric acid of 5 L having 6.5 mol/l was added to a produced extracted organic phase, stirred for 1 hour, applied a cleaning treatment thereto, and cleaned and separated metallic impurities in the organic solvent into an aqueous phase.

(3) Stripping Step to Oxide Production Step

An aqueous solution (0.5 mol/l) produced by dissolving oxalic acid dihydrate of 343 g (an equivalent in terms of calculation amount relative to the amount of scandium in an extracted organic phase) into water of 5 L was added to an extracted organic phase after cleaning, stirred for 60 minutes, stripped the scandium as a crystal of the scandium oxalate. The produced crystal was suctioned from the bottom of an aqueous phase, and cleaned in order by using ethanol of 300 ml and water of 500 ml after suction and filtration thereof. The crystal after cleaning was dried taking 8 hours at temperature of 105 degrees C.

A scandium oxide was produced by pyrolyzing the crystal after drying, under the same condition as that of Example 1. After that, the produced scandium oxide was cooled down up to room temperature to take out the scandium oxide, and a metal grade of the scandium oxide contained in the oxide was analyzed by the emission spectrochemical analysis method. The results of analysis are shown in Table 4 below.

TABLE 4

| Ca | Mg | Sb | Zr | Fe | Si |
|---|---|---|---|---|---|
| <1 | <0.5 | <1 | <1 | <1 | <1 |

As shown in Table 4, it has succeeded in reducing all the impurity elements including the zirconium to less than 1 ppm, and in producing high purity scandium oxide less containing impurities. In this connection, a metal grade of elements other than those shown in Table 4 were all below a lower limit of detection by the emission spectrochemical analysis method.

The invention claimed is:

1. A method for separating and refining scandium comprising:
    an extraction step of mixing an aqueous solution containing scandium with an organic solvent containing a trioctylphosphine oxide to extract the scandium into the organic solvent;
    a stripping step of mixing the organic solvent with a stripping starting solution containing any one or more of water, hydrochloric acid, sulfuric acid, and oxalic acid to strip the scandium from the organic solvent for producing a post-stripped solution; and
    a scrubbing step of mixing the organic solvent from which the scandium is extracted in the extraction step with a hydrochloric acid solution having concentration of 2.0 mol/l to 9.0 mol/l, or a sulfuric acid solution having concentration of 3.5 mol/l to 9.0 mol/l to separate impurities.

2. The method for separating and refining scandium according to claim 1, wherein in the stripping step, the hydrochloric acid solution having concentration of less than 2.0 mol/l, or the sulfuric acid solution having concentration of less than 3.5 mol/l is used as the stripping starting solution.

3. The method for separating and refining scandium according to claim 1, wherein in the stripping step, the oxalic acid solution having concentration of 0.1 mol/l or more to less than 1.0 mol/l is used as a stripping starting solution to produce a crystal of scandium oxalate.

4. The method for separating and refining scandium according to claim 1, further comprising a crystallization step of adding oxalic acid to the post-stripped solution produced in the stripping step.

5. The method for separating and refining scandium according to claim 1, wherein when zirconium is contained in the aqueous solution containing the scandium, the aqueous solution is mixed with an organic solvent containing thenoyltrifluoroacetone to extract and separate the zirconium into an organic solvent prior to the extraction step.

6. A production method for scandium oxide comprising:
   mixing an aqueous solution containing scandium with an organic solvent containing a trioctylphosphine oxide to extract the scandium into the organic solvent;
   a stripping step of mixing the organic solvent with a stripping starting solution containing any one or more of water, hydrochloric acid, sulfuric acid, and oxalic acid to strip the scandium from the organic solvent for producing a post-stripped solution;
   after the stripping step, a crystallization step of adding oxalic acid to the post-stripped solution to produce a crystal of scandium oxalate; and
   a pyrolysis step of heating and pyrolyzing the produced scandium oxalate to produce scandium oxide.

\* \* \* \* \*